United States Patent
Takeuchi et al.

(10) Patent No.: US 7,626,786 B2
(45) Date of Patent: Dec. 1, 2009

(54) COMPACT MAGNETIC HEAD SLIDER WITH REDUCED BEARING SURFACES

(75) Inventors: Yoshinori Takeuchi, Ibaraki (JP); Hidekazu Kohira, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 468 days.

(21) Appl. No.: 11/281,707

(22) Filed: Nov. 16, 2005

(65) Prior Publication Data

US 2006/0114612 A1 Jun. 1, 2006

(30) Foreign Application Priority Data

Nov. 30, 2004 (JP) ............... 2004-345532

(51) Int. Cl.
 *G11B 21/21* (2006.01)
(52) U.S. Cl. .................................. 360/236.3
(58) Field of Classification Search .............. 360/234.3, 360/237
See application file for complete search history.

(56) References Cited

U.S. PATENT DOCUMENTS

| | | | | |
|---|---|---|---|---|
| 6,069,770 | A * | 5/2000 | Cui et al. ................. | 510/175 |
| 6,212,032 | B1 * | 4/2001 | Park et al. ................ | 360/234.7 |
| 6,385,011 | B1 * | 5/2002 | Chang et al. ............ | 360/234.3 |
| 6,583,961 | B2 * | 6/2003 | Levi et al. ............... | 360/236.8 |
| 6,661,612 | B1 * | 12/2003 | Peng ...................... | 360/236.3 |
| 6,710,976 | B2 * | 3/2004 | Chapin et al. ........... | 360/235.8 |
| 6,801,399 | B2 * | 10/2004 | Nakano ................... | 360/236.3 |
| 7,130,154 | B2 * | 10/2006 | Otsuka et al. ............ | 360/237 |
| 2001/0019467 | A1 * | 9/2001 | Otsuka et al. ............ | 360/235.2 |
| 2002/0071216 | A1 * | 6/2002 | Sannino et al. ......... | 360/236.1 |
| 2004/0012888 | A1 * | 1/2004 | Tokuyama et al. ...... | 360/236.6 |
| 2005/0024775 | A1 * | 2/2005 | Kurita et al. ............ | 360/234.3 |
| 2005/0057848 | A1 * | 3/2005 | Okasaka et al. ......... | 360/97.01 |

FOREIGN PATENT DOCUMENTS

JP 2003-123422 4/2003

* cited by examiner

*Primary Examiner*—Mark Blouin
(74) *Attorney, Agent, or Firm*—Townsend and Townsend and Crew LLP; Rambod Nader (57) ABSTRACT

A compact slider has a reduced area of bearing surfaces, thus remarkably decreasing a lifting force obtained by an air bearing characteristic. In one embodiment, a shallowly grooved surface is disposed on an inflow side of a bearing surface of a slider, and a pair of inflow side air bearing surfaces are disposed rearward of and adjacently to the shallowly grooved surface. Side shallowly grooved surfaces are disposed on both sides rearward of the air bearing surfaces in such a manner as to extend near an outflow end. A center air bearing surface is disposed at a center in a width direction at the outflow end of the slider. A magnetic head is mounted at the center air bearing surface. A center shallowly grooved surface is disposed on an inflow side of the center air bearing surface. A deeply grooved surface is disposed at a center of the bearing surface surrounded substantially by the air bearing surfaces, the side shallowly grooved surface, and the center shallowly grooved surface. The ratio of a slider length Lx to a slider width Ly satisfies the following inequality: $1.35 \leq Lx/Ly \leq 1.8$, where the slider width Ly is 0.8 mm or less.

18 Claims, 7 Drawing Sheets

COMPACT MAGNETIC HEAD SLIDER WITH REDUCED BEARING SURFACES

CROSS-REFERENCES TO RELATED APPLICATIONS

This application claims priority from Japanese Patent Application No. JP2004-345532, filed Nov. 30, 2004, the entire disclosure of which is incorporated herein by reference.

BACKGROUND OF THE INVENTION

The present invention relates generally to a magnetic head slider that flies with a fine clearance above a traveling recording medium or comes into intermittent contact with the traveling recording medium, a magnetic head assembly incorporating the magnetic head slider therein, and a magnetic disk drive. More specifically, the present invention relates to a magnetic head slider suitable for a magnetic disk drive in which a small-diameter disk having a diameter of 45.7 mm (1.8 in.) or less is used.

Figure 13:
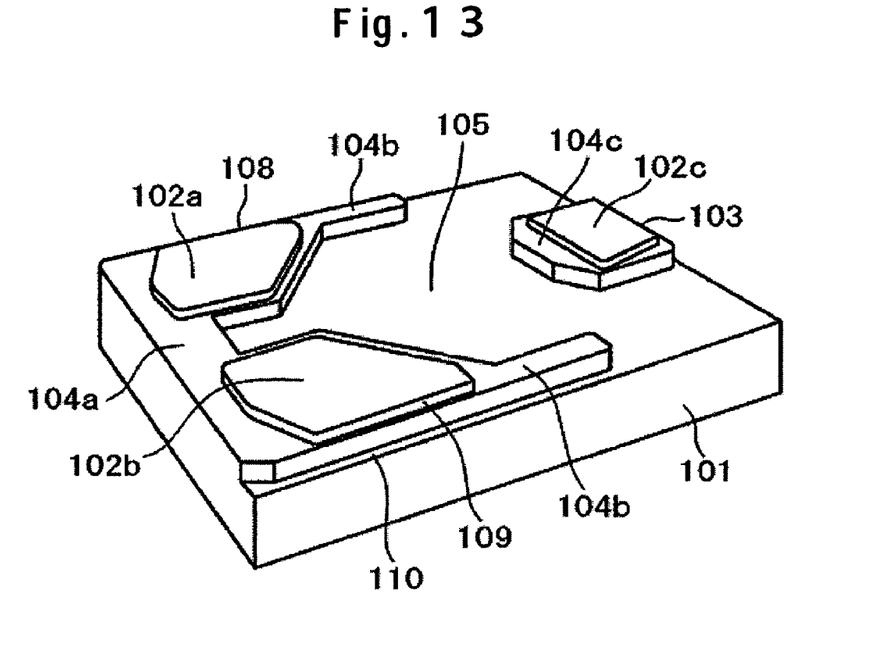
FIG. 13 is a perspective view showing air bearing surfaces of a conventional magnetic head slider.

A magnetic head slider is supported by a flexure attached to a suspension. The magnetic head slider flies with a fine clearance above a magnetic disk or comes into intermittent contact with the magnetic disk so as to write or read data thereon or therefrom. Patent Document 1 (Japanese Patent Laid-open No. 2003-123422) discloses a negative pressure slider which is widely used at present. FIG. 13 shows the construction of the negative pressure slider. A medium opposing surface (i.e., a bearing surface) 108 of a slider 101 includes an air bearing surface 102 (102a, 102b and 102c), a shallowly grooved surface 104 (104a, 104b and 104c) having a step slightly deeper than the air bearing surface 102, and a deeply grooved surface 105 which is more deeply grooved than the shallowly grooved surface 104. The air bearing surface 102 includes a pair of right and left inflow side air bearing surfaces 102a and 102b, which are disposed on an air inflow side rearward of the shallowly grooved surface 104, and a center pad 102c, which is provided at an air outflow end, for mounting a magnetic head 103 thereon. The shallowly grooved surface 104 includes a shallowly grooved surface 104a on the air inflow side, shallowly grooved rails 104b on both sides of the shallowly grooved surface 104a, and a center pad shallowly grooved surface 104c disposed on the air outflow side of the center pad 102c. The deeply grooved surface 105 is substantially surrounded by the shallowly grooved surface 104a disposed on the air inflow side, the inflow side air bearing surfaces 102a and 102b, and the shallowly grooved rails 104b disposed on both sides. According to this construction, the shallowly grooved surface 104 and the air bearing surface 102 provide a step air bearing function. This step air bearing function generates a lifting force for causing the slider to fly above the magnetic disk. At the same time, the function produces a negative pressure at the deeply grooved surface 105. An appropriate air bearing stiffness is thus ensured to allow the slider to stably fly. The slider has a length Lx of 1.25 mm, a width Ly of 1.0 mm, and a height Lz of 0.3 mm. As a result, the ratio Lx/Ly of the slider length to the slider width is 1.25.

Figure 14:
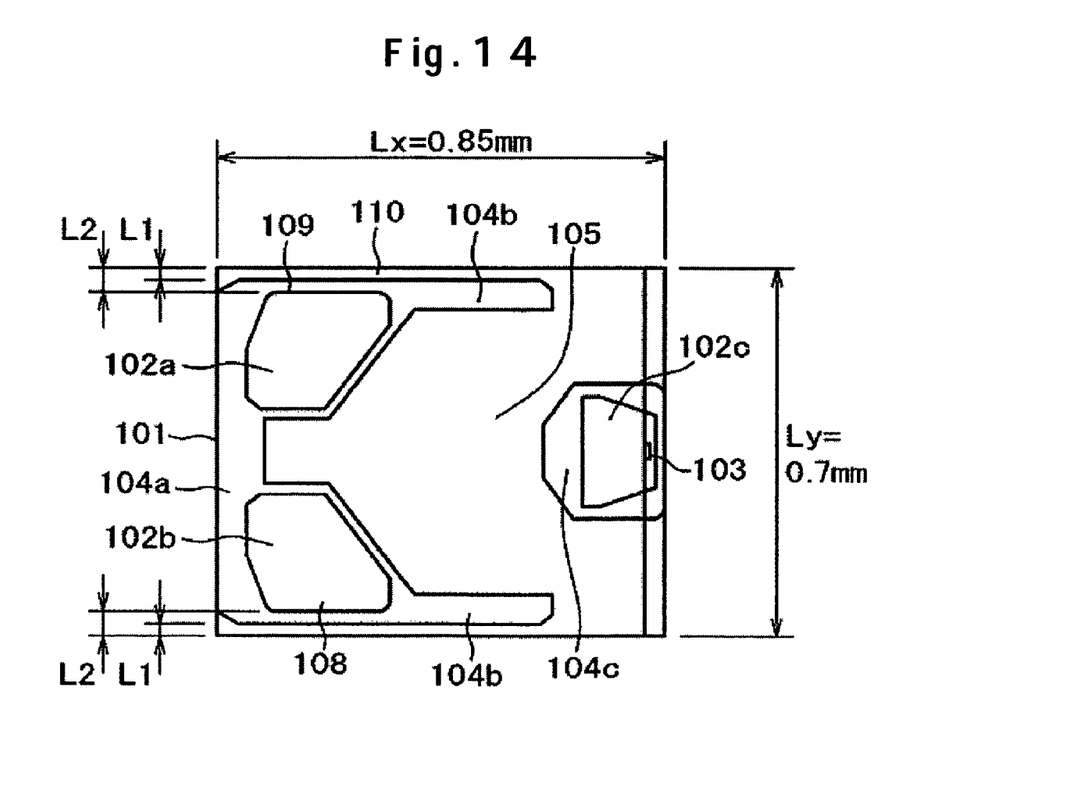
FIG. 14 is a plan view showing the air bearing surfaces of the conventional magnetic head slider.

A recent trend in the magnetic disk drive is shifted toward a compact magnetic disk drive using a small-diameter disk, to thus meet the need for a high recording density and aim at application to compact digital equipment. This trend raises a problem of a decrease in effective data area on a disk. As an approach to solving this problem, there is known a method for reducing the slider in size. There has been developed a compact slider representing reduction in dimension of about 70% of the above-described slider which is widely used at present. FIG. 14 is a plan view showing a compact slider. A slider has a length Lx of 0.85 mm, a width Ly of 0.7 mm, and a height Lz of 0.23 mm. The ratio Lx/Ly of the slider length to the slider width is 1.21. A shallowly grooved surface 109 having a width of 30 µm is formed at a side end of each of air bearing surfaces 102a and 102b on an inflow side, and further, a cutting margin 110 having a width of 30 µm, which is equal to the depth of a deeply grooved surface 105, is formed outside of the shallowly grooved surface 109. As a consequence, a length L2 between the end of the air bearing surface and the end of the slider becomes 60 µm, and further, a length L1 between the end of the air bearing surface and the shallowly grooved surface becomes 30 µm. A suspension load to be applied to a slider 101 is positioned at the center of the slider 101. In this manner, the effective data area of the disk becomes wider by 0.3 mm. This signifies a remarkable improvement for a compact magnetic disk drive, in which a disk size is 25.4 mm (1 in.) or 20.3 mm (0.8 in.)

A reduction in size of the slider, or in particular, a reduction in slider width and slider height can be about double the number of sliders which are taken from a wafer having the same size by using a single magnetic head fabricating apparatus. This also yields a benefit of cost reduction of the slider.

BRIEF SUMMARY OF THE INVENTION

Because of a reduction in size involved with the compact slider, an area of the bearing surface decreases, resulting in that a lifting force by an air bearing characteristic is substantially decreased. A suspension load applied to the slider also should be made small in order to balance with the decreased lifting force. This trend is prominent in a low-speed 2.5-inch magnetic disk drive having a low-disk-speed and a drive using a magnetic disk having a diameter of 45.7 mm (1.8 inches) or less. This is because the lifting force by the bearing characteristic is directly proportional to the speed. The problem of the insufficient lifting force based on the air bearing characteristic cannot arise in the conventional 3.5-inch magnetic disk drive or a high-speed 2.5-inch magnetic disk drive offering a magnetic disk speed of 5400 rpm, 7200 rpm or the like. The problem of the reduced lifting force newly arises when magnetic disk drives using disks having a diameter as small as 25.4 mm (1 in.), 45.7 mm (1.8 in.) and the like have been put into practical applications. Problems arising from the marked decrease in lifting force include the following:

(1) The air bearing stiffness decreases, which degrades the flying characteristic of the slider. In particular, pitch stiffness (i.e., the air bearing stiffness in a longitudinal direction of the slider) is proportional to the length to about the second power. A reduced slider length, therefore, results in that the pitch stiffness is substantially decreased. Consequently, the flying height in a pitch direction severely fluctuates with respect to disturbance vibrations. In worst cases, part of the slider comes into contact with the medium.

(2) Because of the necessity of minimizing the suspension load, shock resistance of the drive during operation is reduced.

(3) A slider using both of positive and negative pressures has two zones: namely, a stable zone and a bi-stable zone. In the stable zone, a negative pressure is produced in a negative pressure area. In the bi-stable zone, the slider can take either one of two modes: namely, a high flying mode and a low flying mode. In the high flying mode, a positive pressure is produced even in the negative pressure area and the slider flies with a flying height of 1 µm or more. In the low flying mode, the slider flies with the originally designed flying height. In a system with a small suspension load, the slider enters the bi-stable zone, thereby frequently inducing the high flying mode so as to make it impossible to read or write data.

(4) The slider may come into contact with the disk at an inflow end when the flying height is reduced due to a decreased ambient pressure or the aforementioned disturbance vibrations or during slider loading (hereinafter referred to as "pitch down"). In such a case, a slider having a small suspension load and a short slider length cannot escape from such a situation, and therefore, is kept in that attitude. The continuous contact damages a contact portion of the disk, thereby dissipating information. This could eventually result in a crash.

(5) The reduced bearing area results in the decrease in the negative pressure as well as the decrease in lifting force. Accordingly, the decrease in flying height with respect to the decrease in ambient pressure becomes large, thus eliminating a flying margin.

(6) When disk drives having high-disk-speeds, e.g., 7200, 10000, and 15000 rpm, record servo information to the magnetic disk, the disk speed is lowered to ½ to ⅓ of the normal speed. With the conventional compact slider, the decrease in flying height with respect to the speed is large, and the flying attitude is not stable, thereby making it impossible to accurately write servo information because of the disk surface contact vibration involved. In extreme cases, the aforementioned pitch down occurs, resulting in a crash at times.

It is a feature of the present invention to provide a magnetic head slider capable of lessening a decrease in lifting force.

It is another feature of the present invention to provide a magnetic head assembly in which a decrease in flying height can be alleviated even in the case of a decrease in ambient pressure.

It is a further feature of the present invention to provide a magnetic disk drive having an improved shock resistance characteristic.

It is a still further feature of the present invention to provide a magnetic head slider and a magnetic disk drive, in which pitch down can be prevented and any damage to a magnetic disk can be avoided.

A magnetic head slider according to an aspect of the present invention comprises: a slider including two air bearing surfaces disposed on both sides on an air inflow side of a medium opposing surface; a shallowly grooved surface disposed between the air bearing surface and an air inflow end; side shallowly grooved surfaces disposed rearward of the two air bearing surfaces and extending near an air outflow end; a center air bearing surface disposed at a widthwise center of the air outflow end of the medium opposing surface; a center shallowly grooved surface disposed on the air inflow side of the center air bearing surface; and a deeply grooved surface surrounded by the two air bearing surfaces and the center air bearing surface; and a magnetic head disposed at the center air bearing surface; wherein the ratio of a slider length Lx to a slider width Ly satisfies the following inequality: $1.35 \leq Lx/Ly \leq 1.8$, the slider width Ly being 0.8 mm or less.

In some embodiments, the slider length Lx is 0.945 mm or more and 1.44 mm or less. Each of the shallowly grooved surface from the two air bearing surfaces and the center shallowly grooved surface from the center air bearing surface has a depth of 200 nm or less, and the deeply grooved surface from the two air bearing surfaces and the center air bearing surface has a depth of 1500 nm or less.

A magnetic head slider according to another aspect of the present invention comprises: a slider including two air bearing surfaces disposed on both sides on an air inflow side of a medium opposing surface; a connection air bearing surface for connecting the two air bearing surfaces to each other on the air inflow side; two pads disposed on both sides of an air inflow end of the medium opposing surface; a shallowly grooved surface disposed between the two air bearing surfaces and the connection air bearing surface, and the air inflow end; side shallowly grooved surfaces disposed rearward of the two air bearing surfaces and extending near an air outflow end; a center air bearing surface disposed at a widthwise center of the air outflow end of the medium opposing surface; a center shallowly grooved surface disposed on the air inflow side of the center air bearing surface; and a deeply grooved surface surrounded by the two air bearing surfaces, the connection air bearing surface and the center air bearing surface; and a magnetic head disposed at the center air bearing surface; wherein the ratio of a slider length Lx to a slider width Ly satisfies the following inequality: $1.35 \leq Lx/Ly \leq 1.8$, the slider width Ly being 0.8 mm or less.

In specific embodiments, each of the two pads is the same in height as each of the air bearing surfaces.

A magnetic head slider according to another aspect of the present invention comprises: a slider including two air bearing surfaces disposed on both sides on an air inflow side of a medium opposing surface; a connection air bearing surface for connecting the two air bearing surfaces to each other on the air inflow side; deposition films disposed on an air outflow side of the two air bearing surfaces; two pads disposed on both sides of an air inflow end of the medium opposing surface; a shallowly grooved surface disposed between the two air bearing surfaces and the connection air bearing surface, and the air inflow end; side shallowly grooved surfaces disposed rearward of the two air bearing surfaces and extending near an air outflow end; a center air bearing surface disposed at a widthwise center of the air outflow end of the medium opposing surface; a center shallowly grooved surface disposed on the air inflow side of the center air bearing surface; and a deeply grooved surface surrounded by the two air bearing surfaces, the connection air bearing surface and the center air bearing surface; and a magnetic head disposed at the center air bearing surface; wherein the ratio of a slider length Lx to a slider width Ly satisfies the following inequality: $1.35 \leq Lx/Ly \leq 1.8$, the slider width Ly being 0.8 mm or less.

In some embodiments, the deposition film has a thickness of 50 nm or less. The deposition film is a carbon film. The deposition film is formed at each of the two pads.

A magnetic head assembly according to another aspect of the present invention comprises: a magnetic head slider including a slider having: two air bearing surfaces disposed on both sides on an air inflow side of a medium opposing surface; a shallowly grooved surface disposed between the air bearing surface and an air inflow end; side shallowly grooved surfaces disposed rearward of the two air bearing surfaces and extending near an air outflow end; a center air bearing surface disposed at a widthwise center of the air outflow end of the medium opposing surface; a center shallowly grooved surface disposed on the air inflow side of the center air bearing surface; and a deeply grooved surface surrounded substantially by the two air bearing surfaces and the center air bearing surface; and a magnetic head disposed at the center air bearing surface, wherein the ratio of a slider length Lx to a slider width Ly satisfies the following inequality: $1.35 \leq Lx/Ly \leq 1.8$, the slider width Ly being 0.8 mm or less; a flexure for holding the slider; and a suspension having the flexure fixed thereto, a pivot position, at which a load is applied to the slider, being deviated by 10% or more of the slider length toward the air inflow side from the center of the slider.

A magnetic disk drive according to another aspect of the present invention comprises: a magnetic head slider including a slider having two air bearing surfaces disposed on both sides on an air inflow side of a medium opposing surface; a shallowly grooved surface disposed between the air bearing surface and an air inflow end; side shallowly grooved surfaces disposed rearward of the two air bearing surfaces and extending near an air outflow end; a center air bearing surface disposed at a widthwise center of the air outflow end of the medium opposing surface; a center shallowly grooved surface disposed on the air inflow side of the center air bearing surface; and a deeply grooved surface surrounded by the two air bearing surfaces and the center air bearing surface; and a magnetic head disposed at the center air bearing surface, wherein the ratio of a slider length Lx to a slider width Ly satisfies the following inequality: $1.35 \leq Lx/Ly \leq 1.8$, the slider width Ly being 0.8 mm or less; and a magnetic disk, on and from which data can be written and read by the magnetic head slider.

In some embodiments, the magnetic disk has a diameter of 45.7 mm or less. The height of a magnetic head slider is about 0.2 mm or less. Additionally, the height of a magnetic head slider in a magnetic disk drive is about 0.2 mm or less.

According to the present invention, a suspension load to the compact slider can be increased by about 1.4 times or more in comparison with the prior art. Accordingly, the shock resistance characteristic during operation can be enhanced by about 1.4 times or more.

DETAILED DESCRIPTION OF THE INVENTION

Specific embodiments of the present invention will be described in detail with reference to FIGS. 1 through 12. Various technically preferable restrictions are imposed on the embodiments, described below, of the present invention. It should be noted, however, that the scope of the present invention is not limited to these embodiments.

Figure 1:
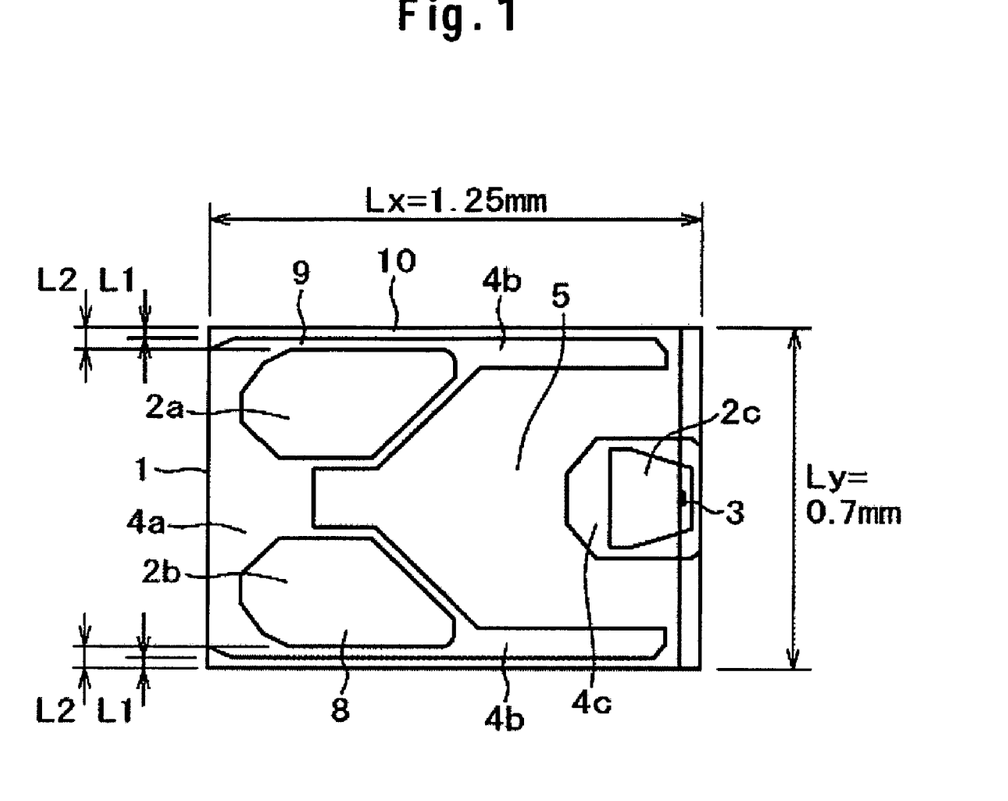
FIG. 1 is a plan view showing air bearing surfaces of a magnetic head slider in a first embodiment according to the present invention.
Figure 2:
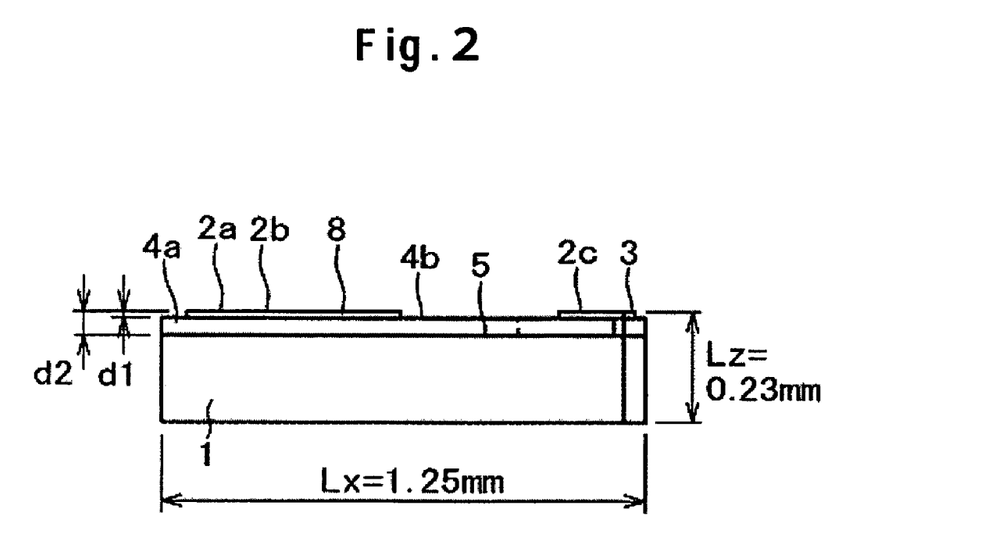
FIG. 2 is a side view showing the magnetic head slider shown in FIG. 1.

FIG. 1 is a plan view of a magnetic head slider in a first embodiment according to the present invention. FIG. 2 is a side view of the magnetic head slider shown in FIG. 1. Referring to FIGS. 1 and 2, in order to generate a lifting force by the use of the effect of an air bearing, the magnetic head slider is constructed such that an inflow side shallowly grooved surface 4a is disposed on an inflow side of a medium opposing surface (i.e., a bearing surface) 8 of a slider 1, and further, a pair of inflow side air bearing surfaces 2a and 2b are disposed rearward of and adjacently to the inflow side shallowly grooved surface 4a. Shallow grooved surface 9 extends from the air bearing surfaces toward the cutting margin 10 at the widthwise edge of the slider. A side shallowly grooved surface 4b is disposed rearward of each of the pair of the inflow side air bearing surfaces 2a and 2b in such a manner as to extend near an outflow end. A center air bearing surface 2c is disposed at a center in a width direction at the outflow end of the slider 1. A magnetic head 3 is mounted at the center air bearing surface 2c. A center shallowly grooved surface 4c is disposed on an inflow side of the center air bearing surface 2c. A deeply grooved surface 5 is disposed at a center of the bearing surface 8 surrounded by the inflow side air bearing surfaces 2a and 2b, the side shallowly grooved surface 4b, and the center shallowly grooved surface 4c.

The height of each of the inflow side air bearing surfaces 2a and 2b is set to be the same as that of the center air bearing surface 2c. In addition, the heights of the inflow side shallowly grooved surface 4a, the side shallowly grooved surface 4b and the center shallowly grooved surface 4c are set to be the same as each other. A slider length Lx is 1.25 mm, a slider width Ly is 0.7 mm, and therefore, the ratio of the slider length Lx to the slider width Ly is 1.79. Moreover, a depth d1 of the shallowly grooved surface from the air bearing surface should be preferably 200 nm or less while a depth d2 of the deeply grooved surface from the air bearing surface should be preferably 1500 nm or less, although an appropriate value may be slightly varied according to a disk diameter or a disk speed in a magnetic disk drive. In the present embodiment, the depth d1 of the shallowly grooved surface from the air bearing surface is about 200 nm while the depth d2 of the deeply grooved surface from the air bearing surface is about 1300 nm. The inflow side shallowly grooved surface 4a is constructed such that a length thereof from an inflow end to each of the inflow side air bearing surfaces 2a and 2b becomes longer on both sides of the slider.

When the magnetic head slider in the present embodiment is made to face a magnetic disk, the arrangement of the air bearing shallowly grooved surface 4a and the air bearing surfaces 2a and 2b causes a lifting force to be generated by the effect of the air bearing, where an air stream occurring as a result of rotation of the magnetic disk is compressed. The air stream expands, on the other hand, at the deeply grooved surface 5, and a negative pressure is generated. When this force generated by the air bearing balances a suspension load applied by a suspension, not shown, for supporting the magnetic head slider, the magnetic head slider flies. The flying height is 15 nm or less at a portion of the magnetic head 3.

Figure 3:
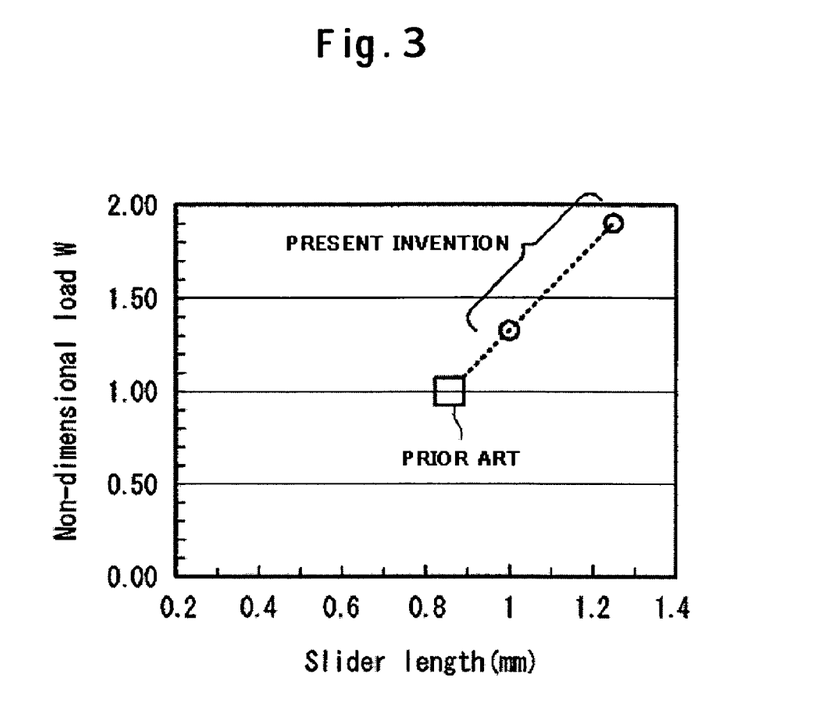
FIG. 3 is a graph illustrating the relationship between the length of the magnetic head slider and a load generated by an air bearing operation.

In the magnetic head slider in the present embodiment, a lifting force (i.e., a load) generated by the air bearing can be remarkably increased by making the slider length more than that of the compact slider in the prior art. FIG. 3 illustrates the relationship between the slider length and the generated lifting force (i.e., the load) with the slider width constant as the rate of variations with respect to the compact slider in the prior art. It is construed that an increase in slider length expresses an increase in air bearing surface on the assumption of a constant area of a negative pressure generation portion. The generated lifting force is substantially proportional to the length. As a result, the generated load can be increased up to about 1.9 times the load of the compact slider shown in FIG. 14 by setting the slider length to 1.25 mm (Lx/Ly=1.8).

The magnetic head slider flies through the balance between the aforementioned lifting force and the suspension load applied by the suspension, not shown. Accordingly, as the lifting force can be made greater, the suspension load can be further increased. The shock resistance of a magnetic disk drive during operation depends upon the condition of the suspension load for preventing the slider from moving away above the magnetic disk due to the force generated by acceleration applied from the outside, that is, the relationship between the acceleration $\alpha$ applied from the outside, a mass m and the suspension load W expressed by the following inequality: $W>m\alpha$. An increase in suspension load with a slider of the same size proportionally enhances the shock resistance. Accordingly, the shock resistance of the magnetic head slider in the first embodiment according to the present invention can be enhanced by the increase in load (about 1.9 times) as compared with the conventional level.

The lifting force (i.e., the load) generated by the air bearing is substantially proportional to a disk speed. As a consequence, the magnetic head slider in the above-described embodiment exhibits a great effect in a disk drive having a small disk diameter and a low disk speed, which may be a disk drive having a diameter of 45.7 mm (1.8 in.) or less and a low disk speed.

Figure 4:
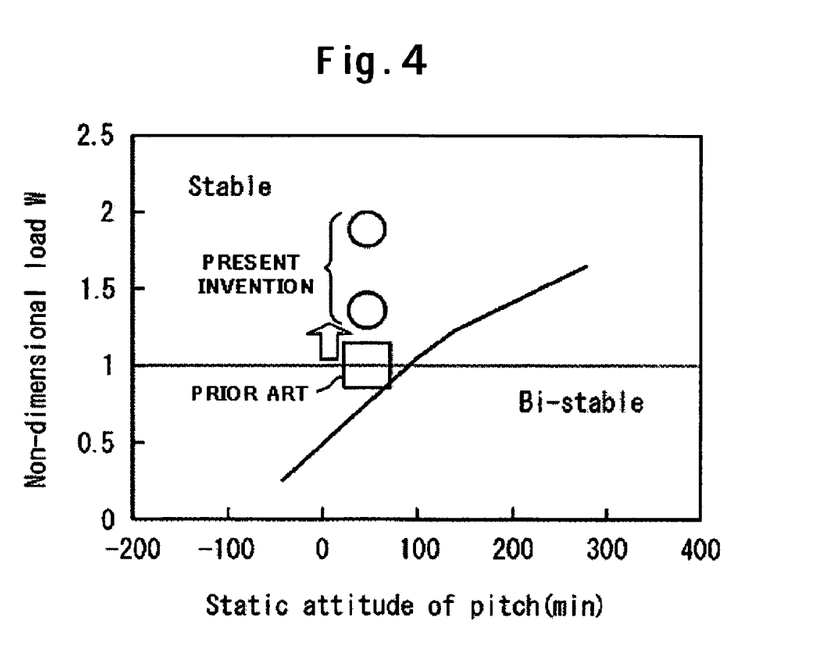
FIG. 4 is a graph illustrating a margin with respect to a bi-stable zone by the magnetic head slider.

FIG. 4 is a graph explanatory of a bi-stable phenomenon. With a slider using a negative pressure, a negative pressure is produced at the deeply grooved surface 5. Such a slider undergoes the following two zones: the stable zone and the bi-stable zone. In the stable zone, the original stable flying is achieved. In the bi-stable zone, the slider can take either a high-flying mode or a low flying mode. In the high-flying mode, a positive pressure is produced also at the deeply grooved surface 5 and the slider flies with a flying height of 1 μm or more. In the low flying mode, the slider flies with the originally designed flying height. A parameter for this bi-stable phenomenon is the suspension load. Increasing the suspension load can increase a margin for avoiding entry into the bi-stable zone. By increasing the load about 1.9 times or more the current level, it is possible to substantially increase the margin for avoiding the entry into the bi-stable zone.

Figure 5:
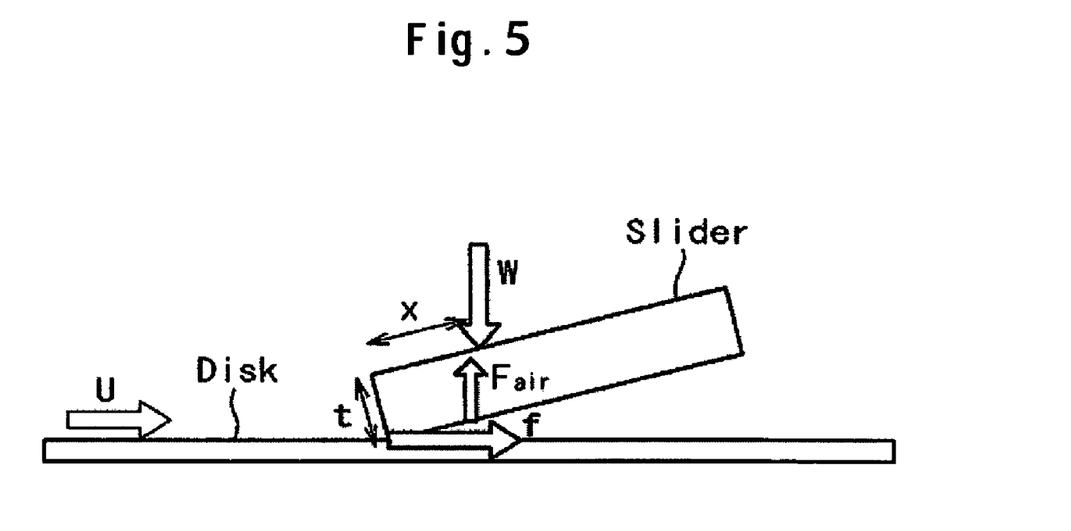
FIG. 5 is a diagram illustrating pitch down state of the magnetic head slider.
Figure 6:
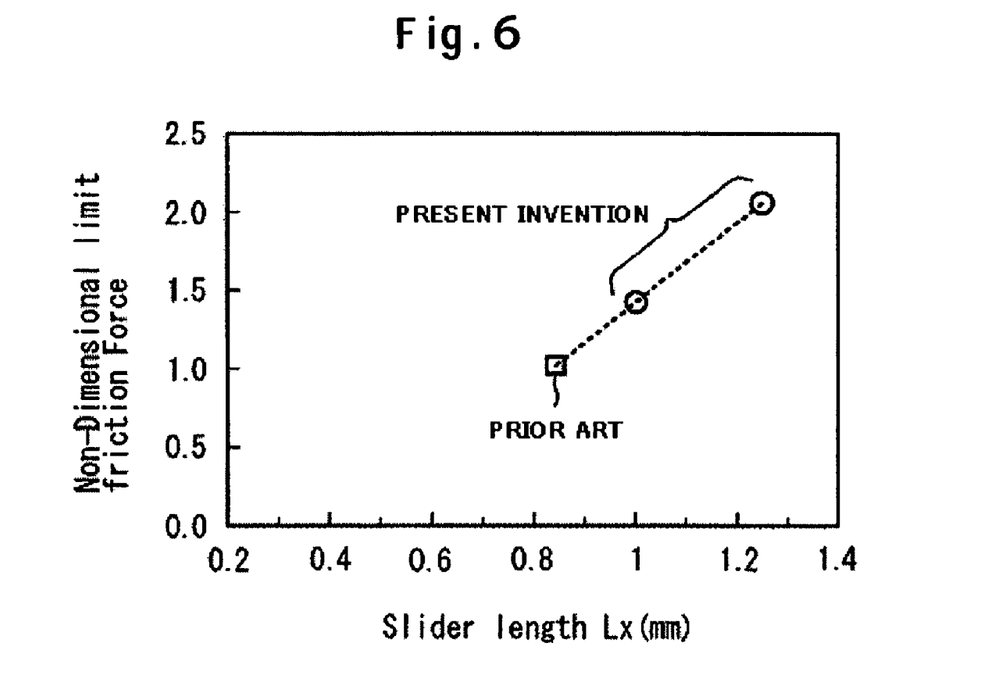
FIG. 6 is a graph illustrating the relationship between the slider length and a limit friction force.

Next, an explanation will be made of a pitch down preventing effect in reference to FIGS. 5 and 6. FIG. 5 shows a phenomenon of pitch down. The pitch down refers to a phenomenon in which the slider is brought into contact with the magnetic disk from the inflow end, and therefore, flies on the side of the magnetic head. FIG. 5 represents a balance of moments exerted on the slider at this time. The slider undergoes the suspension load W, a lifting force Fair generated by the air bearing and a friction force f caused by the pitch down. It is assumed that Lz designates the height of the slider, X1 denotes a distance from a position (i.e., a pivot position), at which the suspension load W is applied to the slider, to the inflow end, X2 designates a distance from a position, on which the lifting force Fair generated by the air bearing acts, to the inflow end, and U denotes a disk speed. In this case, the moment by the load W and the moment by the lifting force Fair need to be greater than the moment by the friction force f in order to prevent any continuous pitch down state. This is expressed by the following inequality: $W \cdot X1 + Fair \cdot X2 > f \cdot Lz$.

In the above-described embodiment, the generated lifting force Fair becomes great by setting the ratio Lx/Ly to 1.8 owing to the increased slider length, and accordingly, the suspension load W also becomes great. Furthermore, the distance x1 from the inflow end to the pivot position also becomes great. As a consequence, it is possible to prevent the pitch down, which has been experienced in the compact slider shown in FIG. 14. FIG. 6 is a graph illustrating the relationship between the slider length and a limit friction force as the rate of the conventional compact slider (where Lx=0.85 mm) to the friction force (where the slider height Lz is constantly 0.23 mm). In the above-described embodiment, the limit friction force can become about double by setting the slider length to 1.25 mm (i.e., Lx/Ly=1.8), thereby preventing any pitch down. Additionally, the limit friction force can be increased by decreasing the slider height Lz. For example, although the slider height Lz is set to 0.23 mm in the above-described embodiment, if the slider height Lz is set to 0.2 mm or less, the limit friction force can be further increased by 15% or more.

Figure 7:
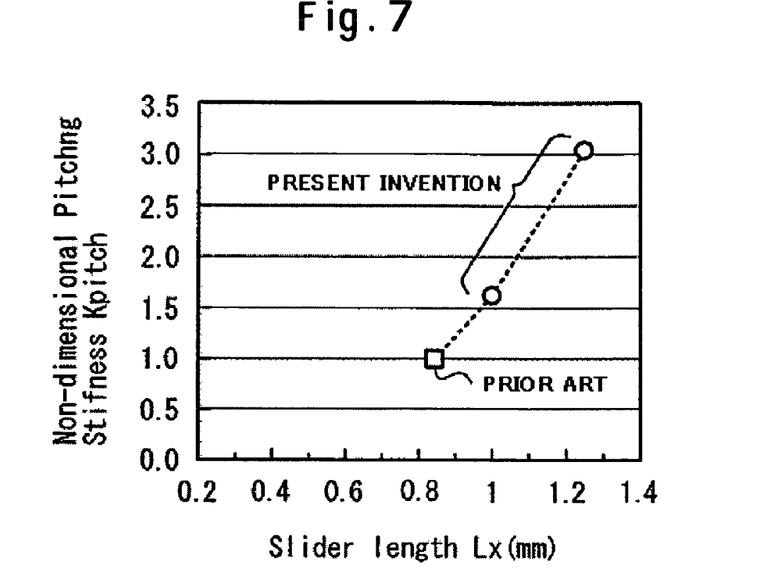
FIG. 7 is a graph illustrating the relationship between the slider length and a pitching stiffness of an air bearing.

FIG. 7 is a graph illustrating the relationship between the slider length and stiffness in a pitching direction in the above-described embodiment. Pitching stiffness can be increased to about triple that of the conventional compact slider by setting the slider length to 1.25 mm, thereby remarkably reducing fluctuations in flying height against disturbance influencing the magnetic disk drive.

In addition, the area of the air bearing surface on the inflow side can be enlarged by increasing the slider length, and therefore, the flying height on the inflow side can be satisfactorily increased. Consequently, it is possible to prevent any pitch down due to a decrease in flying height on the inflow side when a servo signal is written.

Moreover, since the slider width is set to 0.7 mm and the slider height is set to 0.23 mm in the above-described embodiment, the number of sliders to be taken from one wafer becomes about twice in comparison with the conventional slider having a width of 1 mm and a height of 0.3 mm. Thus, an inexpensive slider is provided in which the problems experienced in the prior art have been solved. Additionally, the number of sliders to be taken from one wafer can be further increased by decreasing the slider height Lz.

Figure 8:
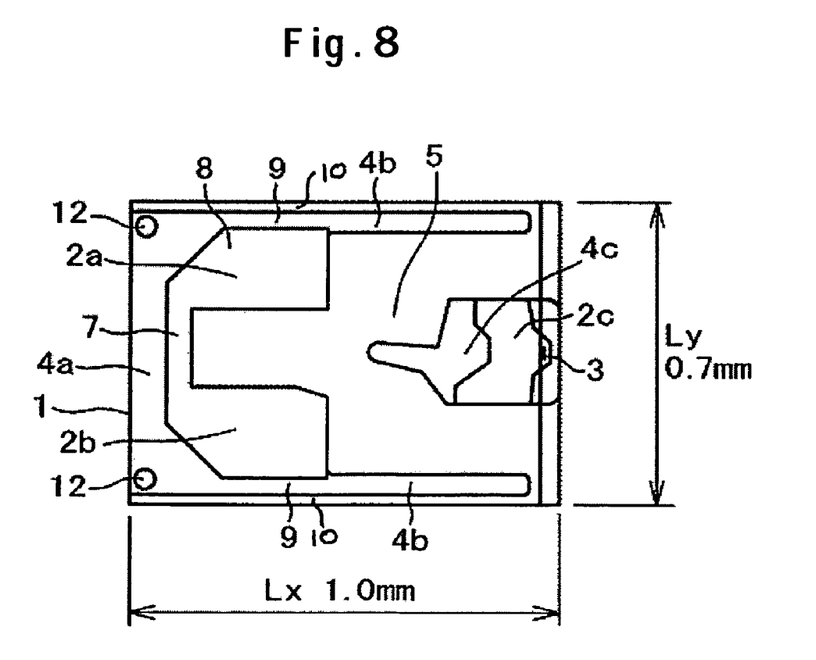
FIG. 8 is a plan view showing air bearing surfaces of a magnetic head slider in a second embodiment according to the present invention.

FIG. 8 is a plan view showing a magnetic head slider in a second embodiment. Here, a slider length Lx is set to 1.0 mm; a slider width Ly, to 0.7 mm; and the ratio of the slider length Lx to the slider width Ly, to about 1.4. An inflow side shallowly grooved surface 4a is disposed on an inflow side of a bearing surface 8 of a slider 1. Furthermore, a pair of inflow side air bearing surfaces 2a and 2b are disposed rearward of and adjacently to the inflow side shallowly grooved surface 4a. Shallow grooved surface 9 extends from the air bearing surfaces toward the cutting margin 10 at the widthwise edge of the slider. The inflow side air bearing surfaces 2a and 2b are connected to each other on an inflow side thereof via a connection air bearing surface 7, to provide a single air bearing surface. Side shallowly grooved surfaces 4b are disposed rearward on both sides of the pair of the inflow side air bearing surfaces 2a and 2b, respectively, in such a manner as to extend near an outflow end. Moreover, a center air bearing surface 2c is disposed at a center in a width direction at the outflow end of the slider 1. A magnetic head 3 is mounted at the center air bearing surface 2c. A center shallowly grooved surface 4c is disposed on the inflow side of the center air bearing surface 2c. A deeply grooved surface 5 is disposed at a center of the bearing surface 8 surrounded substantially by the inflow side air bearing surfaces 2a and 2b, the connection air bearing surface 7, the side shallowly grooved surface 4b, and the center air bearing surface 2c.

The inflow side air bearing surfaces 2a and 2b are connected to each other via the connection air bearing surface 7 in the second embodiment according to the present invention. This arrangement allows the lifting force produced at this portion to be greatly increased. The length of the connection air bearing surface 7 may be made shorter than that of each of the inflow side air bearing surfaces 2a and 2b. This enables peaks of a positive pressure to be distributed on both sides, thus ensuring an air bearing stiffness in a lateral direction. Moreover, since the connection between the air bearing surfaces can increase the expansion of air to the deeply grooved surface 5, the negative pressure can be made larger, and further, the slider can stably fly at a low flying height. The slider in the present embodiment is particularly suitable for a small-diameter magnetic disk of a low disk speed. Here, a depth d1 of a shallow groove is set to about 160 nm, and further, a depth d2 of a deep groove is set to about 900 nm. In the present embodiment, the generated lifting force becomes about 1.3 times that in the prior art, thereby producing the same effect as that in the first embodiment.

Furthermore, inflow end pads 12, each having the same height as that of the air bearing surface, are disposed on both sides of the air inflow end. The pad formed by dry etching has a smooth corner. Consequently, in the case where the inflow end of the slider is brought into contact with the disk due to the pitch down, the inflow end pad is brought into contact therewith. Therefore, a contact area becomes smaller with a soft contact, thereby reducing damage to the disk. Moreover, the inflow side of the slider may be brought into contact with a medium. In this case, since a clearance is defined by a depth of the shallow groove and the air flows through the clearance, the stable flying can be quickly recovered, thus preventing any pitch down.

Figure 9:
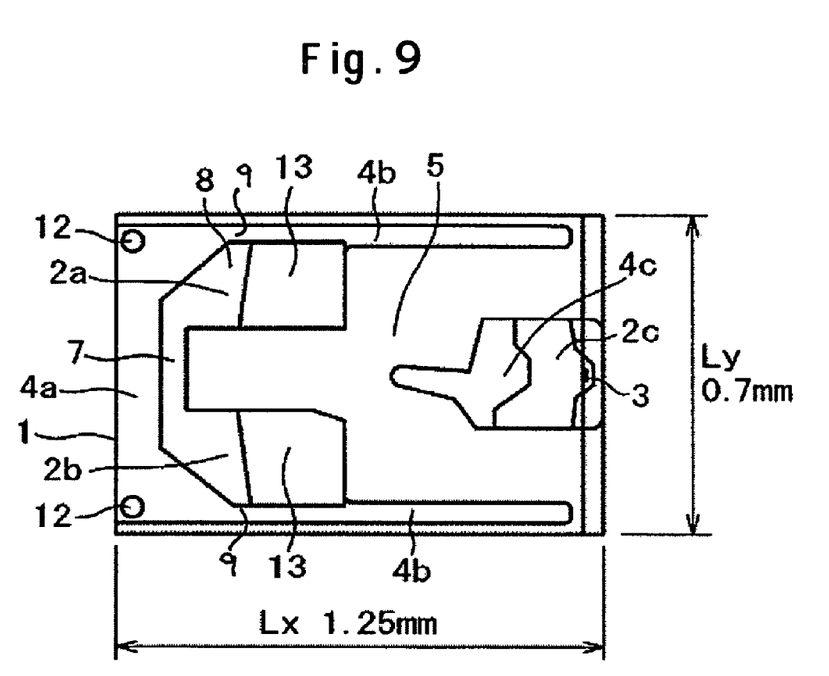
FIG. 9 is a plan view showing air bearing surfaces of a magnetic head slider in a third embodiment according to the present invention.
Figure 10:
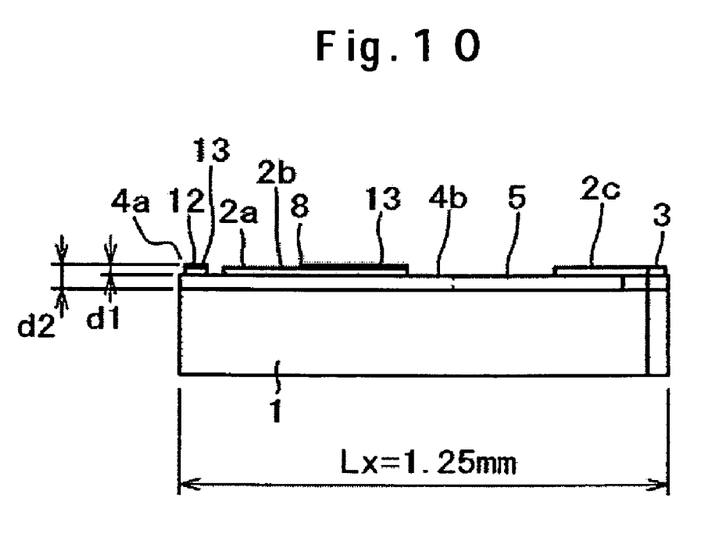
FIG. 10 is a side view showing the magnetic head slider shown in FIG. 9.

FIG. 9 is a plan view showing a magnetic head slider in a third embodiment. Furthermore, FIG. 10 is a side view of the magnetic head slider shown in FIG. 9. Here, a slider length Lx is set to 1.25 mm, and a slider width Ly is set to 0.7 mm. In the present embodiment, films made of carbon or the like are formed in a thickness of 50 nm or less on an outflow side of inflow side air bearing surfaces 2a and 2b by deposition, respectively. In the present embodiment, deposition films 13 are formed in the same thickness also on inflow end pads 12, respectively, in the same process. Since the deposition films 13 and the inflow side air bearing surfaces 2a and 2b independently function as step air bearings, the lifting force can be further increased. In the meantime, a negative pressure area can be increased by decreasing an area at which the lifting force is generated, thereby producing the effect that a decrease in flying height can be suppressed to a low level when an ambient pressure is decreased. The deposition film 13 formed on the inflow end pad 12 can alleviate contact damage at the time of the contact with the disk. Furthermore, the inflow end pad 12 keeps the large air inflow clearance, thereby further enhancing the effect of preventing any pitch down state. Three kinds of positive pressure surfaces, that is, the surfaces of the deposition films 13, the air bearing surfaces 2a, 2b and 2c and shallowly grooved surfaces 4a, 4b and 4c and 9 are disposed in the present embodiment. The effect produced by the slider length and the slider height can be however achieved in the same manner also in a configuration including the air bearing surfaces 2a, 2b and 2c and first and second shallowly grooved surfaces which are different in depth or a configuration including surfaces having further complicated shapes.

Figure 11:
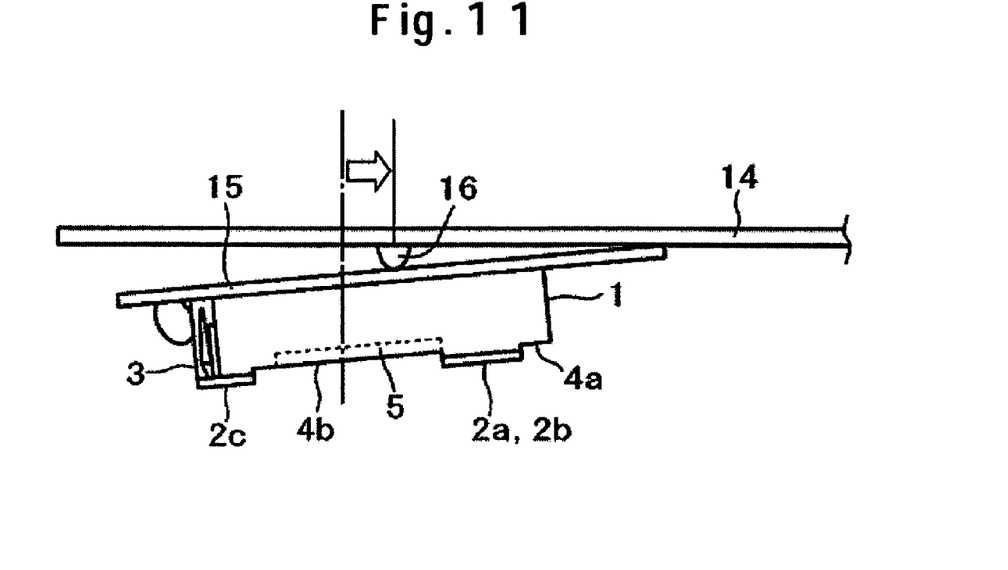
FIG. 11 is a side view showing a magnetic head assembly in a fourth embodiment according to the present invention.

FIG. 11 is a side view showing a magnetic head assembly in a fourth embodiment. Here, a slider 1 may be any one of the sliders described in the above-described embodiments. The slider 1 is supported by a flexure 15 fixed to a suspension 14. A pivot 16 for applying a suspension load of the suspension 14 is deviated by about 10% or more from the center of the slider 1 toward the inflow side of the slider. A slider length Lx is set to 1.25 mm. Since a bearing surface is reduced owing to the miniaturization of the slider 1, a negative pressure generation area is reduced, thereby decreasing a negative pressure force. The negative pressure force acts in a direction in which a decrease in flying height is induced in the case where an ambient pressure is decreased. In the compact slider in the prior art, a decrease in flying height of 2 nm or more at an altitude of 3000 m has been generated due to the little effect of the pivot deviation. In contrast, since the negative pressure force is increased by setting the slider length Lx to 1.25 mm and the pivot is deviated toward the inflow side at the same rate in the present embodiment, the decrease in flying height at an altitude of 3000 m can be remarkably suppressed to about 1 nm.

Figure 12:
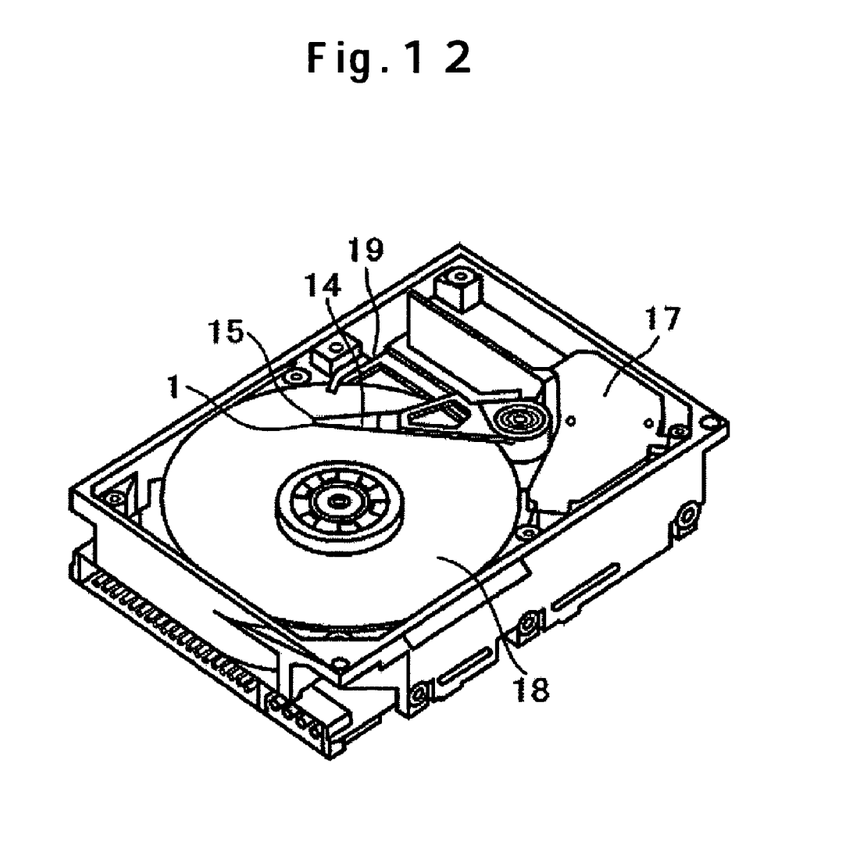
FIG. 12 is a perspective view showing a magnetic disk drive.

FIG. 12 is a view of a magnetic disk drive in which the magnetic head slider or the magnetic head assembly in the above-described first to fourth embodiments is incorporated. A magnetic head slider 1 flies above a rotating magnetic disk 18. The magnetic head slider 1 is supported by a flexure 15 attached to a suspension 14. The magnetic head slider 1 is positioned at a predetermined location of the magnetic disk 18 by an actuator 17, and then, writes or reads information on or from the magnetic disk 18. When the rotation of the magnetic disk 18 is stopped, the magnetic head slider 1 is unloaded on a loading/unloading ramp 19 outward of the magnetic disk. Since the suspension load of the magnetic head slider can be increased in this magnetic disk drive, the magnetic disk drive can offer an enhanced shock resistance characteristic during its operation.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head slider comprising:
a slider having opposing widthwise edges and including:
two air bearing surfaces disposed on both sides on an air inflow side of a medium opposing surface;
a shallowly grooved surface disposed between the air bearing surface and an air inflow end;
a second shallowly grooved surface extending from the air bearing surfaces toward the respective proximate widthwise edges;
side shallowly grooved surfaces disposed rearward of the two air bearing surfaces and extending near an air outflow end;
a center air bearing surface disposed at a widthwise center of the air outflow end of the medium opposing surface;
a center shallowly grooved surface disposed on the air inflow side of the center air bearing surface; and
a deeply grooved surface surrounded by the two air bearing surfaces and the center air bearing surface; and
a magnetic head disposed at the center air bearing surface;
wherein the ratio of a slider length Lx to a slider width Ly satisfies the following inequality: $1.35 \leq Lx/Ly \leq 1.8$, the slider width Ly being 0.8 mm or less.

2. A magnetic head slider according to claim 1, wherein the slider length Lx is 0.945 mm or more and 1.44 mm or less.

3. A magnetic head slider according to claim 1, wherein each of the shallowly grooved surface from the two air bearing surfaces and the center shallowly grooved surface from the center air bearing surface has a depth of 200 nm or less, and the deeply grooved surface from the two air bearing surfaces and the center air bearing surface has a depth of 1500 nm or less.

4. A magnetic head slider according to claim 1, wherein the slider has a height of 0.2 mm or less.

5. A magnetic head slider comprising:
a slider having opposing widthwise edges and including:
two air bearing surfaces disposed on both sides on an air inflow side of a medium opposing surface;
a connection air bearing surface for connecting the two air bearing surfaces to each other on the air inflow side;
two pads disposed on both sides of an air inflow end of the medium opposing surface;
a shallowly grooved surface disposed between the two air bearing surfaces and the connection air bearing surface, and the air inflow end;
a second shallowly grooved surface extending from the air bearing surfaces toward the respective proximate widthwise edges;
side shallowly grooved surfaces disposed rearward of the two air bearing surfaces and extending near an air outflow end;
a center air bearing surface disposed at a widthwise center of the air outflow end of the medium opposing surface;
a center shallowly grooved surface disposed on the air inflow side of the center air bearing surface; and
a deeply grooved surface surrounded by the two air bearing surfaces, the connection air bearing surface and the center air bearing surface; and
a magnetic head disposed at the center air bearing surface;
wherein the ratio of a slider length Lx to a slider width Ly satisfies the following inequality: $1.35 \leq Lx/Ly \leq 1.8$, the slider width Ly being 0.8 mm or less.

6. A magnetic head slider according to claim 5, wherein each of the two pads is the same in height as each of the air bearing surfaces.

7. A magnetic head slider according to claim 5, wherein the slider length Lx is 0.945 mm or more and 1.44 mm or less.

8. A magnetic head slider comprising:
a slider having opposing widthwise edges and including:
two air bearing surfaces disposed on both sides on an air inflow side of a medium opposing surface;
a connection air bearing surface for connecting the two air bearing surfaces to each other on the air inflow side;
deposition films disposed on an air outflow side of the two air bearing surfaces;
two pads disposed on both sides of an air inflow end of the medium opposing surface;
a shallowly grooved surface disposed between the two air bearing surfaces and the connection air bearing surface, and the air inflow end;
a second shallowly grooved surface extending from the air bearing surfaces toward the respective proximate widthwise edges;
side shallowly grooved surfaces disposed rearward of the two air bearing surfaces and extending near an air outflow end;
a center air bearing surface disposed at a widthwise center of the air outflow end of the medium opposing surface;
a center shallowly grooved surface disposed on the air inflow side of the center air bearing surface; and
a deeply grooved surface surrounded by the two air bearing surfaces, the connection air bearing surface and the center air bearing surface; and
magnetic head disposed at the center air bearing surface;
wherein the ratio of a slider length Lx to a slider width Ly satisfying the following inequality: $1.35 \leq Lx/Ly \leq 1.8$, the slider width Ly being 0.8 mm or less.

9. A magnetic head slider according to claim 8, wherein the deposition film has a thickness of 50 nm or less.

10. A magnetic head slider according to claim 8, wherein the deposition film is a carbon film.

11. A magnetic head slider according to claim 8, wherein the deposition film is formed at each of the two pads.

12. A magnetic head slider according to claim 8, wherein the slider has a height of 0.2 mm or less.

13. A magnetic head assembly comprising:
a magnetic head slider including:
a slider having opposing widthwise edges and having:
two air bearing surfaces disposed on both sides on an air inflow side of a medium opposing surface;
a shallowly grooved surface disposed between the air bearing surface and an air inflow end;
a second shallowly grooved surface extending from the air bearing surfaces toward the respective proximate widthwise edges;
side shallowly grooved surfaces disposed rearward of the two air bearing surfaces and extending near an air outflow end;
a center air bearing surface disposed at a widthwise center of the air outflow end of the medium opposing surface;
a center shallowly grooved surface disposed on the air inflow side of the center air bearing surface; and
a deeply grooved surface surrounded by the two air bearing surfaces and the center air bearing surface; and
a magnetic head disposed at the center air bearing surface,
wherein the ratio of a slider length Lx to a slider width Ly satisfying the following inequality: $1.35 \leq Lx/Ly \leq 1.8$ the slider width Ly being 0.8 mm or less;
a flexure for holding the slider; and
a suspension having the flexure fixed thereto, a pivot position, at which a load is applied to the slider, being deviated by 10% or more of the slider length toward the air inflow side from the center of the slider.

14. A magnetic head assembly according to claim 13, wherein the slider has a height of 0.2 mm or less.

15. A magnetic head assembly according to claim 13, wherein the slider length Lx is 0.945 mm or more and 1.44 mm or less.

16. A magnetic disk drive comprising:
a magnetic head slider including:
a slider having opposing widthwise edges and having:
two air bearing surfaces disposed on both sides on an air inflow side of a medium opposing surface;
a shallowly grooved surface disposed between the air bearing surface and an air inflow end;
a second shallowly grooved surface extending from the air bearing surfaces toward the respective proximate widthwise edges;
side shallowly grooved surfaces disposed rearward of the two air bearing surfaces and extending near an air outflow end;
a center air bearing surface disposed at a widthwise center of the air outflow end of the medium opposing surface;
a center shallowly grooved surface disposed on the air inflow side of the center air bearing surface; and a deeply grooved surface surrounded substantially by the two air bearing surfaces and the center air bearing surface; and a magnetic head disposed at the center air bearing surface, wherein the ratio of a slider length Lx to a slider width Ly satisfies the following inequality: $1.35 \leqq Lx/Ly \leqq 1.8$ the slider width Ly being 0.8 mm or less; and a magnetic disk, on and from which data can be written and read by the magnetic head slider.

17. A magnetic disk drive according to claim 16, wherein the magnetic disk has a diameter of 45.7 mm or less.

18. A magnetic disk drive according to claim 16, wherein the slider has a height of 0.2 mm or less.

* * * * *